W. H. REDINGTON.
JUG OR SIMILAR VESSEL.
APPLICATION FILED FEB. 2, 1912.
1,110,402.
Patented Sept. 15, 1914.
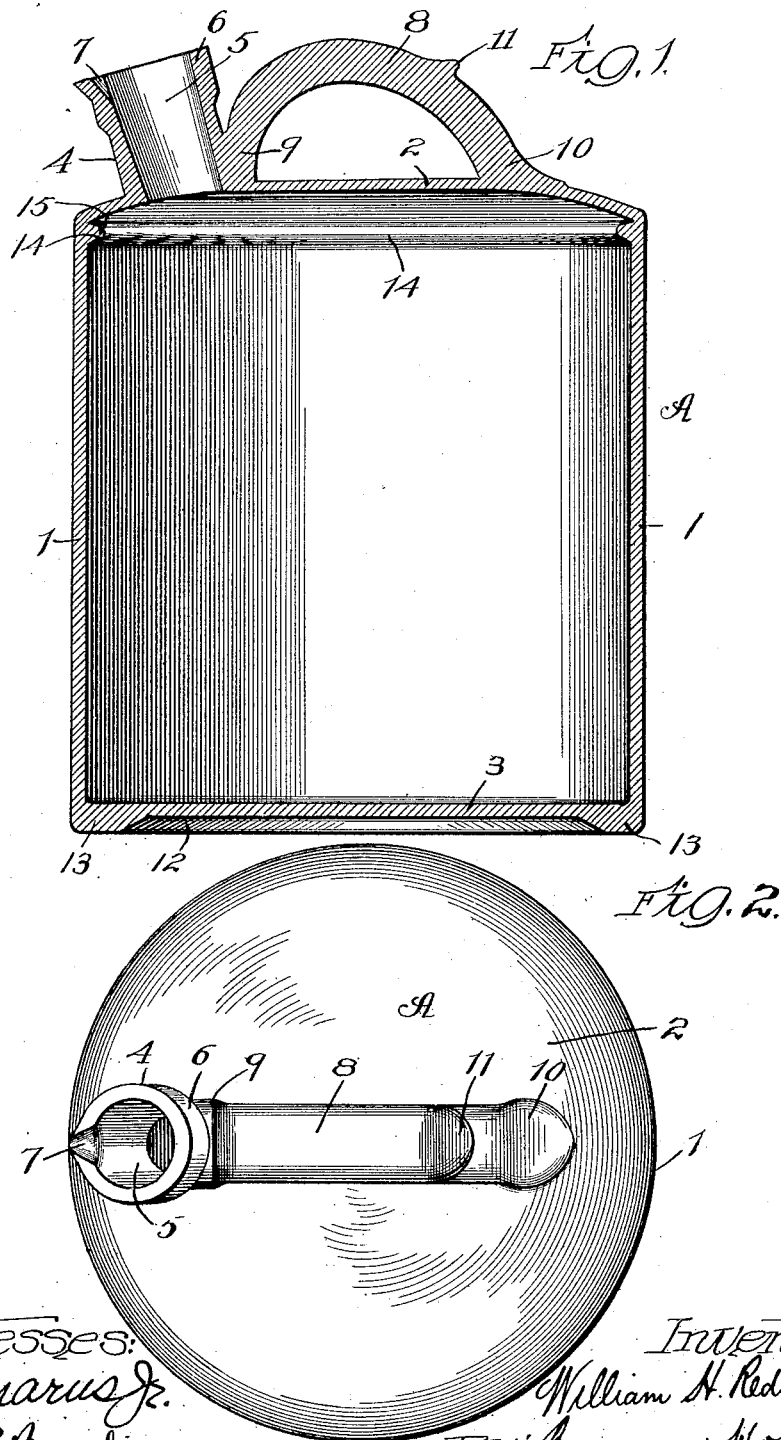

UNITED STATES PATENT OFFICE.

WILLIAM H. REDINGTON, OF EVANSTON, ILLINOIS.

JUG OR SIMILAR VESSEL.

1,110,402.

Specification of Letters Patent. Patented Sept. 15, 1914.

Application filed February 2, 1912. Serial No. 675,035.

*To all whom it may concern:*

Be it known that I, WILLIAM H. REDINGTON, a citizen of the United States, residing at Evanston, in the county of Cook and State of Illinois, have invented certain new and useful Improvements in Jugs or Similar Vessels, of which the following is a specification.

My invention relates to vessels of the class commonly known as jugs, for containing and carrying liquid, and one of the objects of my invention is to provide an improved jug which will be strong and durable, capable of being conveniently and comfortably carried, and neat in appearance.

Another object of my invention is to provide an improved jug having its spout and handle so disposed with relation to the body or containing vessel that the jug may be comfortably controlled with one hand and the liquid may be poured from the jug in a fine stream and into a small vessel if desired without danger of flooding or spilling the liquid.

Another object is to provide an improved jug having its spout and handle completely disposed within the general confines of the sides of the jug and in compact and symmetrical relation whereby the jugs may be securely packed and shipped without danger of breakage.

Another object is to provide an improved jug embodying simple and effective means for preventing sediment from flowing out with the liquid.

To the attainment of these ends and the accomplishment of other new and useful objects hereinafter appearing, my invention consists in the features of novelty disclosed in the construction, combination and arrangement of parts herein described and claimed, and shown in the accompanying drawing which illustrates one embodiment of my invention, and in which:

Figure 1 is a central vertical sectional view of a jug embodying my invention. Fig. 2 is a top plan view thereof.

The various jugs, particularly those manufactured from clay, glass and like materials, generally consist of a closed vessel having a short spout or nozzle arranged practically in the center of the top of the jug and having a handle positioned at the side of the nozzle and projecting beyond the side of the jug. These jugs, as is well known, are inconvenient and clumsy to handle, and it is extremely difficult to pour liquid from the jug into a smaller vessel. Furthermore the offset handle renders the carrying of the jug extremely uncomfortable and inconvenient on account of the fact that the jug is not balanced. Jugs of this character are also objectionable from the standpoint of packing and shipping since they are not symmetrical. In consequence they are easily broken or cracked in transmission and considerable loss thereby accrues. My invention overcomes all of these objectionable features.

In the drawings I have shown my invention as applied to the ordinary clay jug. This jug A is preferably in the form of a closed, hollow vessel having a cylindrical side wall 1 and integral bottom and top walls 3 and 2 respectively. The top wall 2 as will be seen, is slightly convex for the sake of appearance and convenience in manufacture. An inclined spout or nozzle 4 preferably substantially cylindrical in form rises from the top wall of the jug and is preferably formed integrally therewith. This spout has a central passage or bore 5 extending therethrough and communicating with the interior of the jug. The passage 5, as will be noticed, is slightly tapered downwardly so that a cork or stopper may be inserted into it as is the custom in closing jugs of this character. The cylindrical wall of the spout is considerably thickened at the upper end 6 as a precaution against the splitting or cracking of the spout when the cork is forced into place. I prefer to provide a small tapered depression or groove 7 in the upper edge of the spout wall, for the purpose of guiding the liquid. This permits a very fine stream to be poured therefrom.

It will be noted that the spout 4 is positioned adjacent to the side wall of the jug, although it does not project beyond the side wall. By disposing the spout in this position the jug may be conveniently placed in pouring relation to a very small vessel, without danger of spilling the liquid when the jug is tilted. Rising from the top wall is a handle 8 which as is seen lies substantially above the central portion of the jug, and entirely within the confines or diameter of the top. This handle is preferably loop-shaped or rounded, and like the other parts of the jug, is preferably made of the same material and formed integrally therewith. One end 9 of the handle merges or is connected with the base of the spout, and the other end 10 is similarly formed or connected with the top wall. These ends are preferably on diametrically opposite sides of the vertical axis of the jug and in alinement with the nozzle, thus providing a balanced structure. Since the jug is balanced in this manner it is an easy matter to control the pouring of liquid therefrom by one hand grasping the handle. A small integral projection or lug 11 is provided in the handle so that a better hold may be obtained. Should the weight of the jug and the liquid contained therein be too heavy to permit the jug to be lifted and tilted by one hand grasping the handle, the bottom of the jug may be grasped by the other hand, and in order that a firm hold may be obtained on the bottom I raise the bottom wall 3 in a manner preferably as shown in Fig. 1. This may be conveniently accomplished by providing a shallow depression 12 in the bottom wall. This also leaves a thickened rim 13 which increases the strength of the jug at this point.

It sometimes happens that sediment collects in the jug when the liquid contained therein has been standing for some time. When the jug is used for holding ink for instance, it is desirable that the sediment should not pass off with the liquid. Referring to the drawings it will be seen that I have provided an annular rib or ridge 14 on the interior side wall of the jug adjacent the top wall thereof. This simple device forms a very effective barrier to the sediment and when the jug is tilted for pouring the sediment collects against the barrier and in the annular pocket-like space 15 between the rib and the upper or top wall of the jug.

What I claim as new and desire to secure by Letters Patent is:

As a new article of manufacture, a jug comprising a hollow vessel, a spout therefor communicating with the interior thereof, and an annular rib projecting from the interior wall of said vessel in position to prevent sediment from passing off with the liquid.

In testimony whereof I have signed my name to this specification, in the presence of two subscribing witnesses, on this 31st day of January A. D. 1912.

WILLIAM H. REDINGTON.

Witnesses:
J. H. JOCHUM, Jr.,
EDGAR F. BEAUBREN.

---

Copies of this patent may be obtained for five cents each, by addressing the "Commissioner of Patents, Washington, D. C."